United States Patent
Bradshaw et al.

[15] 3,648,839

[45] Mar. 14, 1972

[54] METHOD AND APPARATUS FOR DETECTING AND SEPARATING OUT OVERWEIGHT LETTERS

[72] Inventors: Robert S. Bradshaw, Broomall, Pa.; Donald M. Golden, Cherry Hill, N.J.; Marvin Shapiro, Philadelphia, Pa.

[73] Assignee: Burroughs Corporation, Detroit, Mich.

[22] Filed: Nov. 6, 1970

[21] Appl. No.: 87,436

[52] U.S. Cl. .................................. 209/121, 177/1, 177/210, 209/DIG. 1
[51] Int. Cl. ......................................................... B07c 5/20
[58] Field of Search ................... 209/121, 72, DIG. 1; 73/67, 73/67.2; 177/1, 210

[56] References Cited

UNITED STATES PATENTS

| | | | |
|---|---|---|---|
| 2,323,023 | 6/1943 | Flanagan | 209/121 |
| 3,550,771 | 12/1970 | Spyropoulos | 209/121 |

*Primary Examiner*—Richard A. Schacher
*Attorney*—Charles S. Hall

[57] ABSTRACT

A method and apparatus for separating out overweight letters, wherein the letters are transported serially on their longitudinal edges at a controlled speed into a pinch roller pair driven by a constant torque clutch at a tangential velocity greater than the linear speed of the letters immediately prior to entry into the pinch rollers. The loss of rotational velocity of the pinch rollers caused by the mass of the slower moving letter is automatically compared against a standard loss of rotational velocity by the pinch roller pair for a letter of maximum allowable mass for a given postage, and overweight letters are automatically gated out of the transport stream.

14 Claims, 4 Drawing Figures

INVENTORS
ROBERT S. BRADSHAW,
DONALD M. GOLDEN &
MARVIN SHAPIRO

BY Charles P. Padgett Jr.

AGENT

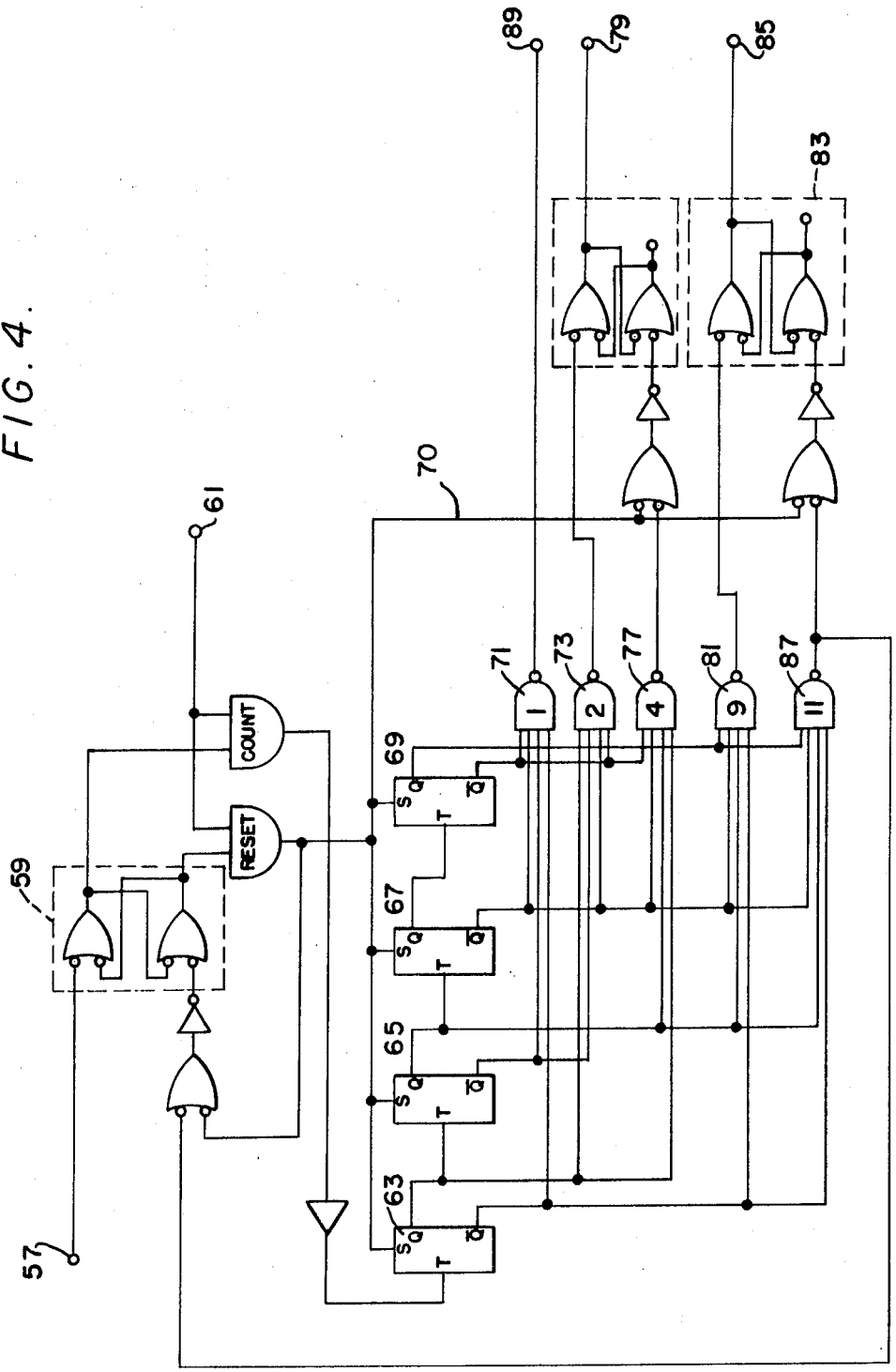

3,648,839

METHOD AND APPARATUS FOR DETECTING AND SEPARATING OUT OVERWEIGHT LETTERS

BACKGROUND OF THE INVENTION

This invention relates to a method and apparatus for weighing and sorting rapidly and continuously moving sheet-like objects, such as letters, and projecting the articles into first and second channels dependent upon their weight.

In the handling of mail, it is becoming increasingly necessary to provide automatic mechanisms for handling the high volume of mail processed daily. Since proper postage for letter mail is determined by the weight of the letter, machine processing of mail requires sorters for separating out letters weighing more than that covered by basic postage or for further sorting against a second or third threshold, and inspection as to the proper postage.

Various devices have been tried for separating overweight items from a collection of mail. For example, devices were developed using a beam type of weighing platform opposed by a spring. These platforms required a relatively great amount of space, but more importantly, these weighing platforms were subject to vibrations at frequencies which could cancel out the spring deflection caused by the weight of the mail pieces. Forced damping reduced the period required for the platform to come to rest but, once weighed, the letters had to be transferred, usually by hand, for further processing. Thus, not only is the opportunity great for an inaccurate measurement of the weight of the letter, but, also, the weighing process is too time consuming when large quantities of mail are processed.

Because a considerable amount of time is involved in the weighing process, the Post Office selects only a random sample of the letters being processed to check for weight. Thus, a potentially great number of letters that are overweight is undetected, resulting in a considerable loss of revenue to the Post Office Department.

It is, therefore, an important object of this invention to test the weight of each letter in a rapidly moving train of letters against a standard weight mailable for a given postage during machine processing.

It is another object of this invention to separate overweight letters from a rapidly moving train of letters from a collection of raw mail by machine processing.

SUMMARY OF THE INVENTION

Accordingly, this invention, by utilizing the principle of conservation of momentum, tests the mass of each letter in a rapidly moving train of letters against a predetermined standard of mass and segregates the letters into first or second channels dependent upon their weight. Each letter of the train, moving at a predetermined linear speed, is passed through a pinch roller pair driven through a drag-responsive clutch at a tangential velocity that is greater than the linear speed of the letters. As each letter passes through the pinch rollers, the drag imposed by the slower moving letter causes the rollers to slow down. After a short transient period, the tangential speed of the rollers and the linear speed of the letter become equal. The change in velocity of the pinch rollers is compared against a threshold loss of velocity due to a letter of maximum mass for the standard postage involved and, if overweight, an individual letter is gated out of the train.

Other objects, advantages, and features of this invention will become more fully apparent from the following detailed description, appended claims, and accompanying drawings in which:

FIG. 4 is a schematic of the logic circuitry associated with the overweight detector of this invention.

DETAILED DESCRIPTION OF THE PREFERRED EMBODIMENT

Figure 1:
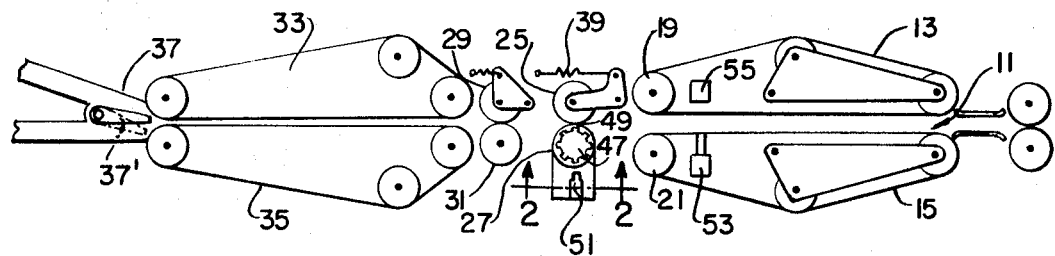
FIG. 1 is a plan view of the overweight detector of this invention.
Figure 2:
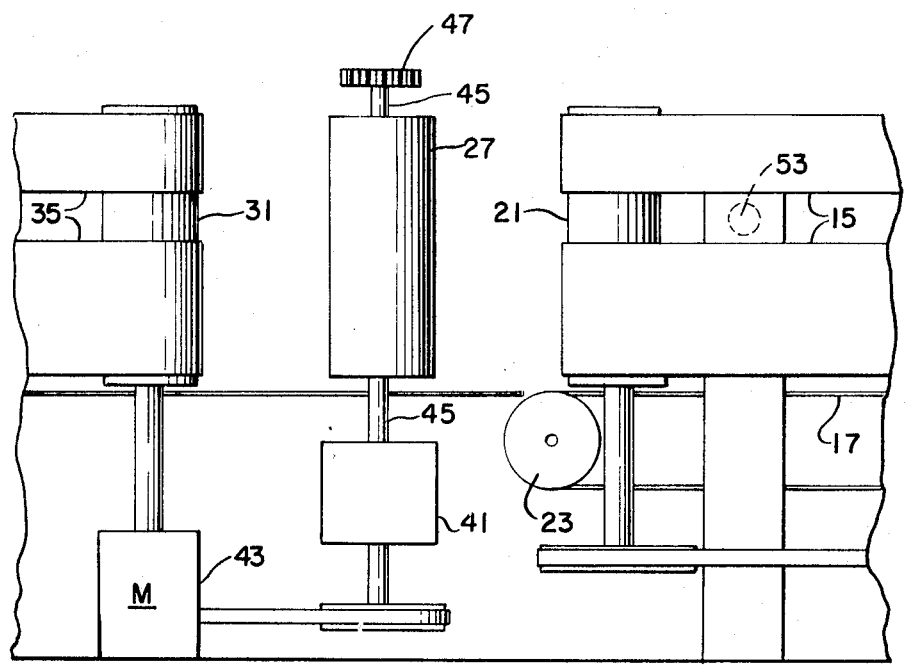
FIG. 2 is a partial elevational view of the pinch roller assembly of this invention taken along lines 2—2 of FIG. 1.

As shown in FIGS. 1 and 2, letters are moved on their longitudinal edges through a transport chute 11 by transport belts 13, 15 and 17 forming the two sides and the bottom of the chute, respectively. The transport belts are driven at a constant speed, such as 160 inches per second (in./sec.), by drive rollers, such as 19, 21, and 23 as known in the art.

The letters are preferably propelled at a constant speed, and it is desirable that the letters not be frictionally gripped or clamped by the transport belts as they are emerging from the chute 11. In the preferred embodiment, therefore, the belts 13 and 15 forming the sides of the chute are set about 5/16th of an inch apart and the bottom of the chute is formed by transport belt 17.

Each letter of the train is propelled by the transport belts 13, 15, 17 into the bite of drag-responsive pinch rollers 25 and 27 which are rotated at a tangential velocity greater than the linear speed of the letters entering the pinch rollers. Such tangential velocity might be, for example, 212 in./sec. as compared with the linear speed of the letters of 160 in./sec.

The pinch rollers 25, 27 are driven by a drag-responsive clutch 41 and the rollers will slow down in proportion to the drag of the slower moving letters, as explained hereinafter.

The amount by which the drag-responsive pinch rollers 25, 27 are slowed is proportional to the mass of the letter responsible for the slowing. The mass of the letter may then be compared with the mass of a standard letter and determinations as to whether or not a given letter is overweight may be made by applying the principle of conservation of momentum, provided the initial velocity (i.e., the velocity of the pinch roller 27 before it has made contact with the slower moving letter) and the final velocity (i.e., velocity of pinch roller 27 after it has made contact with and been slowed by the letter) are known.

As the letters are ejected from the pinch rollers 25, 27 they are picked up by constant surface speed rollers 29, 31 having a tangential velocity such as 212 in./sec. The leading edge of the letter is grasped by the rollers 29, 31 while the trailing edge is still in the pinch roller pair 25, 27. The pull of the constant speed rollers 29, 31 on the letter quickly restores the pinch roller pair 25, 27 to their normal speed of 212 in./sec. tangential velocity and ejects the letter into the pull of transport belt 33, 35.

If the weight of an individual letter has not slowed the drag-responsive pinch rollers 25, 27 down to some speed below the threshold used to establish some standard postage weight, the letter is processed through gate 37, as shown in solid lines and into a further transport system for continued machine processing. If the weight of an individual letter slows the drag-responsive pinch rollers 25, 27 to a speed below the threshold speed used to establish a representation of the standard postal weight, the gate 37 will be switched to the dotted position 37' and the overweight letter will be gated out of the regular stream of mail and into the diverted transport system to be processed separately.

Of the drag-responsive roller pair 25, 27, roller 25 may be an idle roller biased into frictional relationship with the driven drag-responsive pinch roller 27 by a spring 39 as known in the art.

Figure 3:
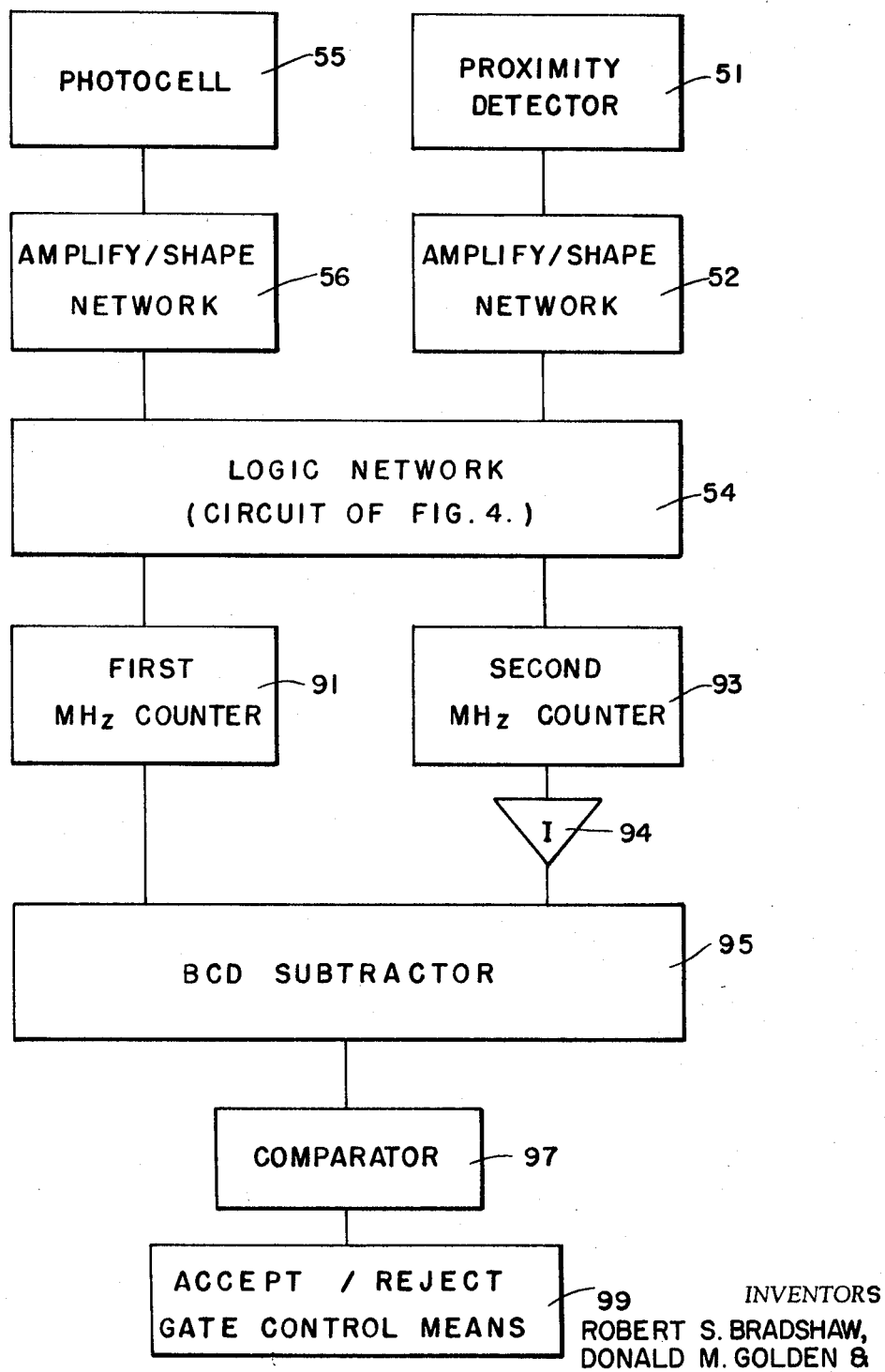
FIG. 3 is a block diagram of the electrical system of the overweight detector of this invention.

Referring to FIGS. 1, 2, and 3, drag-responsive pinch roller 27 is driven through a hysteresis clutch 41 by a motor 43, which also may be used to drive the other elements of the transport chute. As is well known, the hysteresis clutch 41 will permit the driven roller 27 to slow down in response to the drag on the periphery of the roller. Since the transport belts 13, 15 are set wider apart than the customary thickness of letters, as explained previously, there is very little tendency for the transport belts to drive the rear end of a letter after the advancing end has encountered the pinch roller pair 25, 27. The pinch rollers will, therefore, be slowed down merely by the drag due to the momentum of the letter itself and not due to any external forces.

Within the drag-responsive pinch roller 27 and rigidly attached to the upper end of the shaft 45 driving the roller 27 is a wheel 47, having at least eight teeth 49 eventually spaced around its periphery. The teeth 49 are metal or other magnetic material for interacting with a magnetic pick-up or proximity detector 51, shown in FIGS. 1 and 3, to provide a counting pulse each time a tooth rotates past the detector 51. Each pulse produced in this manner, is fed to an amplifying and wave-shaping network, shown as block 52 of FIG. 3, and thence to the logic circuit of FIG. 4, which is indicated symbolically as block 54 in the block diagram of FIG. 3.

The shaped pulses coming from the amplifying and wave-shaping network 52 are continuously generated by the magnetic pick-up 51 and are used to continuously reset a ripple-through-counter in the logic circuit 54 until the arrival of an enabling pulse from photocell 55 which starts the count. The first pulse to come through the counter will toggle the counter to a zero state and supply a clear pulse to first and second megahertz counters 91, 93. This clear pulse lasts a full one-eighth of a revolution of wheel 47 until the next pulse to arrive from the magnetic pick-up 51 is counted. The arrival of the second pulse must indicate a complete eighth of a revolution, and this pulse is used to establish conditions in the logic circuitry 54 for initiating the start of the first megahertz counter 91. This first megahertz counter continues to count for one-quarter of a revolution. As explained with respect to FIG. 4, on the fourth pulse the first megahertz counter 91 is stopped and the count is retained. This count is indicative of the initial velocity of the drag-responsive pinch roller 27 before the letter has made contact with the pinch roller pair 25, 27 and before the roller pair has been slowed thereby. After contact has been made, the drag-responsive pinch roller pair 25, 27 will be slowed by an amount proportional to the mass of the letter under the well-known physical principle of the conservation of momentum.

Referring further to FIGS. 1 and 3, the second megahertz counter 93 is used to determine the slowed velocity of the drag-responsive pinch roller 27. After the letter has contacted the pinch roller pair 25, 27 some time is allowed during which the velocity of the drag-responsive pinch roller 27 and the letter are equalized. Then, on the ninth magnetic pulse, the second megahertz counter 93 is started and allowed to count for a one-quarter of a revolution. The 11th pulse stops the second megahertz counter 93 and the count is retained. This count is a measure of the slowed velocity of drag-responsive pinch roller 57. Therefore, the first megahertz counter 91 has stored a count which is a measure of the initial velocity over a quarter of a revolution of pinch roller 27, and the second megahertz counter 93 has stored a count which is a measure of the slowed velocity of pinch roller 27 measured over a second quarter of a revolution. The difference between these two counts is theoretically proportional to the weight of the letter.

In order to measure the difference between the reading stored in the first megahertz counter 91 and the reading stored in the second megahertz counter 93, a binary-coded decimal (BCD) subtractor 95 is used. The count stored in the first counter 91 is fed to the BCD subtractor 95 and the count stored in the second counter 93 is inverted by inverter 94 and is then fed into a comparator 97 which is pre-programmed with a threshold value which represents the difference in velocities due to an established standard mass for a given postage. If the comparator indicates that the measured difference is greater than the pre-programmed difference, then the letter is overweight and a signal is produced and fed to an accept/reject means 99 which changes the position of gate 37 from the "accept" position to the "reject" position, thereby, gating the overweight letter out of the main stream of mail and into a diverted transport system to be processed separately. The accept/reject gate control means 99 include means for timing the operation of gate 37 so as to reject only those letters which are determined to be overweight and to pass those letters which are determined to be of proper weight. Such comparator circuits and gate-operating means including timing means, are well known in the art and may be pre-programmed with a number of values representing various standard masses so that the system would be capable of making numerous comparisons and operating a plurality of gates for further weight breakdowns as desired.

In order to get a count which is representative of the initial velocity of drag-responsive roller 27, it is necessary that the count be made before the letter has impacted the pinch roller pair 25, 27. A lamp 53 and photocell 55 (FIG. 1) are aligned across the transport chute 11 in the path of travel of letters before they reach the pinch roller pair 25, 27. As the advancing letter cuts the path of light from the lamp 53, the photocell 55 produces a pulse which is used to enable the logic circuit 54 of FIG. 3. This pulse is first fed to an amplifying and wave-shaping circuit 56 in order that the pulse will have an edge sufficiently sharp to operate the digital logic contained in block 54 of the circuit of FIG. 3 and utilized by the digital components of the logic circuit of FIG. 4. Lamp 53 and photocell 55 are preferably so positioned in the path travel of letters along the chute 11, that the leading edge of each letter will cause photocell 55 to emit a pulse exactly one full revolution of the drag-responsive pinch roller 27 before the letter engages the abutting surfaces of the pinch roller pair 25, 27.

Referring now to FIGS. 3 and 4, the logic circuitry utilized to control the operation of the megahertz counters 91 and 93 will be described. The various components utilized are well-known and need not be described in detail.

A pulse from the photocell 55, after it has been shaped and amplified in the circuit of block 56, is fed to input 57 of the circuit of FIG. 4, which is represented generally by block 54 of the circuit of FIG. 3. This pulse sets a latch-type flip-flop 59 which will enable the circuit to accept pulses from the magnetic proximity detector 51.

Pulses from the proximity detector 51 are fed to a similar amplifying and wave-shaping network 52 and then to magnetic pulse input 61. As indicated previously, these magnetic pulses arrive continuously, at input 61 and are used for continuously resetting a ripple-through counter comprising four JK flip-flops 63, 65, 67, and 69 and latch flip-flops 75 and 83 via common line 70. When the photocell pulse arrives at input 57 and sets latch flip-flop 59, the first magnetic pulse after the photocell pulse to arrive at input 61 will toggle through the ripple-through counter and set JK flip-flops 63, 65, 67 and 69 to the zero state. This first pulse will cause decoding gate 71, a conventional NAND gate, to gate a clear pulse to first and second megahertz counters 91 and 93 through lead 89. This clear pulse will zero the megahertz counters and will last a full one-eighth of a revolution until the arrival of a second magnetic pulse through input 61. The second pulse to arrive at input 61 will again toggle the ripple-through counter, and since this count is indicative of a complete one-eighth of a revolution, decoding gate 73 passes a pulse which enables the latch-type flip-flop 75 which starts the first megahertz counter 91 through latch circuit output 79. The third magnetic pulse to arrive at input 61 has no effect on the circuit, but the fourth pulse to be counted will cause an output at decoding gate 77 and latch-type flip-flop 75 will be disabled thereby stopping the first megahertz counter 91 and allowing it to retain its count.

A period of time, here five-eighths of a revolution, is allowed so that after the letter has impacted the pinch roller pair 25, 27, the velocity is stabilized. The ninth pulse to be counted passes a pulse through a decoding gate 81 and this pulse is used to set a latch-type flip-flop 83. The setting of this latch-type flip-flop 83 produces a pulse at output 85 which is used to start the second megahertz counter 93. A quarter of a revolution later, the 11th pulse gates a signal through decoding gate 87 to latch-type flip-flop 83 disabling the flip-flop and turning off the second megahertz counter 93. This signal is also used to disable latch-type flip-flop 59 until the arrival of another start pulse at input 57 from the photocell circuit. The numbers shown within the decoding gates 71 to 87 of the circuit of FIG. 4 indicate the number of counted pulses necessary to trigger that particular gate, as known in the art.

In the prime embodiment herein described, the values stored in the first and second megahertz counters are binary coded decimal numbers. The number stored at the first megahertz counter 91 is fed directly to a BCD subtractor 95 and the number stored in the second megahertz counter 93 is fed to inverter 94, and thence, to the BCD subtractor 95. The difference is then taken and is fed to a comparator circuit 97 which compares this difference, which is representative of the actual mass of the letter, with a pre-programmed value representative of a standard mass, and if the weight of the letter exceeds the weight of the standard mass, the accept/reject means 99 will cause gate 37 to shift to the dotted position 37' and separate out the overweight letter for separate processing. If the weight of the letter is less than the weight of the standard mass, the letter will continue on its present course, gate 37 remaining in the position shown in the solid lines of FIG. 1.

Although a specific apparatus has been shown for the purpose of describing applicant's method for detecting and separating out overweight letters, it will be apparent to those skilled in the art, that other variations in the specific structures illustrated and the specific circuits or electronic components used in these circuits may be made without departing from the spirit and scope of the invention which is limited only by the appended claims.

What is claimed is:

1. An apparatus for identifying articles having a mass greater than a standard comprising:
   means for transporting said articles in succession at a first velocity,
   drag-responsive means driven by a constant torque and having a normal rotational speed greater than said first velocity for receiving said articles in succession from said transporting means,
   means for measuring the decrease in velocity of said drag-responsive means when frictionally engaged by said articles, and
   means for comparing said loss of velocity with a predetermined loss of velocity of said drag-responsive means when an article of threshold mass frictionally engages said drag-responsive means.

2. The apparatus of claim 1 wherein said articles are planar, said transporting means transports said articles on a longitudinal edge and said drag-responsive means includes a pinch roller pair.

3. The apparatus of claim 2 wherein said means for measuring the change in velocity of said pinch rollers includes:
   means for measuring the velocity of said pinch rollers before said article passes therebetween,
   means for measuring the velocity of said pinch rollers while said article passes therebetween, and
   means for subtracting the measured speed as the article passes therebetween from the measured speed before the article passes therebetween.

4. The apparatus of claim 3 wherein said means for measuring the speed before said article passes between said pinch rollers includes:
   means for measuring the rotational displacement of one of said pinch rollers, and
   a first counter for counting a high frequency signal during a predetermined rotational displacement of said pinch roller, the resulting count being indicative of the time required for said pinch roller to rotate through said predetermined distance and wherein said means for measuring the speed while said article passes between said pinch roller includes:
   means for measuring the rotational displacement of one of said pinch rollers, and
   a second counter for counting a high frequency signal during a second predetermined rotational displacement of said pinch roller, the resulting count being indicative of the time required for said pinch roller to rotate through said predetermined distance.

5. The apparatus of claim 4 further including:
   logic means for starting said first counter at the beginning of said predetermined rotational displacement, for stopping said first counter at the end of said predetermined rotational displacement, for starting said second counter at the beginning of said second predetermined rotational displacement, and for stopping said second counter at the end of said second predetermined rotational displacement.

6. The apparatus of claim 5 wherein said means for measuring the rotational displacement of one of said pinch rollers also includes:
   a proximity detector, and a multi-tooth wheel fixedly attached to one of said pinch rollers, the output of said proximity detector being fed to said logic means.

7. The apparatus of claim 6 wherein said means for transporting said planar article includes:
   a horizontal transport belt and two vertically disposed conveyor belts, said horizontal and vertical belts forming a corridor moving at said first velocity.

8. The apparatus of claim 7 further including means for enabling said logic means.

9. The apparatus of claim 8 wherein said means for enabling said logic means includes:
   a lamp and a photodetector mounted on opposite sides of said moving corridor and providing an initiating signal when said planar article passes therebetween.

10. The apparatus of claim 9 further including:
    gating means for normally channeling said planar articles in a first direction and for channeling individual articles in a second direction when the mass of said individual article exceeds said threshold mass; and means responsive to said comparing means for controlling the operation of said gating means.

11. The apparatus of claim 10 further including means for propelling said planar article toward said gating means and restoring said article to said first velocity.

12. A method of separating moving articles on a weight basis comprising the steps of:
    measuring the time interval required for a drag-responsive constant mass to rotate through a given angle,
    frictionally engaging said moving article with said rotating mass,
    measuring the time interval required for said constant mass to rotate through said given angle during said frictional engagement,
    comparing the difference in said measured time intervals to a threshold value, and
    separating said articles on the basis of said comparison.

13. A method of sorting continually moving planar articles on a weight basis comprising the steps of:
    providing a rotatable mass,
    rotating said mass at a first tangential velocity,
    reducing said tangential velocity by contacting said rotating mass with one of said moving planar articles,
    obtaining a value representative of the change in the tangential velocity of said rotating mass,
    comparing said value with a threshold value representative of a standard article mass, and
    separating out overweight articles.

14. The method of claim 13 wherein said value-obtaining step includes:
    measuring the time required for said mass to rotate through a given angle before said moving article contacts said rotating mass,
    measuring the time required for said mass to rotate through an equivalent angle after said moving article has contacted said rotating mass and their speeds have stabilized, and
    subtracting to determine the difference in said time intervals.

* * * * *